United States Patent
Kleibl et al.

(10) Patent No.: US 8,308,367 B2
(45) Date of Patent: Nov. 13, 2012

(54) COMPENSATION OF ROTATIONAL SHAFT INCLINATION

(75) Inventors: Albrecht Kleibl, Grosshennersdorf (DE); Christian Heichel, Niedernberg (DE)

(73) Assignee: ABI Anlagentechnik-Baumaschinen-Industriebedarf Maschinenfabrik und Vertriebsgesellschaft mbH, Niedernberg (DE)

( * ) Notice: Subject to any disclaimer, the term of this patent is extended or adjusted under 35 U.S.C. 154(b) by 382 days.

(21) Appl. No.: 12/596,797

(22) PCT Filed: Apr. 16, 2008

(86) PCT No.: PCT/EP2008/003036
§ 371 (c)(1),
(2), (4) Date: Feb. 19, 2010

(87) PCT Pub. No.: WO2008/128691
PCT Pub. Date: Oct. 30, 2008

(65) Prior Publication Data
US 2010/0202717 A1 Aug. 12, 2010

(30) Foreign Application Priority Data
Apr. 20, 2007 (DE) .......... 10 2007 018 796

(51) Int. Cl.
*F16C 23/04* (2006.01)
(52) U.S. Cl. .................................... 384/192
(58) Field of Classification Search .......... 384/192–212, 384/215, 295, 906
See application file for complete search history.

(56) References Cited

U.S. PATENT DOCUMENTS

| | | | |
|---|---|---|---|
| 1,928,114 A | 9/1933 | Scheffler | |
| 3,073,654 A | 1/1963 | Richey | |
| 3,746,328 A | 7/1973 | Martt | |
| 3,804,475 A | 4/1974 | Brucher et al. | |
| 3,822,080 A | 7/1974 | Pere | |
| 4,037,887 A | 7/1977 | Germain | |
| 4,395,142 A * | 7/1983 | Lobeck | 384/192 |
| 4,601,590 A * | 7/1986 | Arii et al. | 384/906 |
| 5,407,334 A * | 4/1995 | Sano et al. | 384/192 |
| 5,445,457 A | 8/1995 | Schliephack | |
| 5,496,158 A * | 3/1996 | Barito et al. | 418/55.5 |
| 6,482,141 B1 | 11/2002 | Munsche | |

(Continued)

FOREIGN PATENT DOCUMENTS
DE 1898696 U 8/1964
(Continued)

OTHER PUBLICATIONS
International Search Report in English.

*Primary Examiner* — Thomas R Hannon
(74) *Attorney, Agent, or Firm* — Collard & Roe, P.C.

(57) ABSTRACT

Bearing arrangement for a shaft rotatable around an axis of rotation comprising a bearing including an inner bearing part for coupling to an end of the shaft and an outer bearing part for coupling to a mounting structure, and a retaining and pivoting element, which is connectable to the inner bearing part or the outer bearing part, wherein the retaining and pivoting element is designed for securing the end of the shaft against movement in a direction in parallel with the axis of rotation (4) in relation to the bearing and for permitting the end of the shaft to be pivoted with respect to the axis of rotation, and an arrangement comprising the bearing arrangement and the shaft, as well as an oscillator comprising said arrangement.

18 Claims, 2 Drawing Sheets

U.S. PATENT DOCUMENTS

2007/0053751 A1 3/2007 Heichel et al.

FOREIGN PATENT DOCUMENTS

| DE | 1575613 | A1 | 5/1970 |
| DE | 2241425 | A1 | 3/1973 |
| DE | 2243792 | A1 | 4/1973 |
| DE | 2155519 | A1 | 5/1973 |
| DE | 2245913 | A1 | 4/1974 |
| DE | 2621318 | A1 | 11/1976 |
| DE | 4216408 | A1 | 12/1993 |
| DE | 19628669 | A1 | 1/1998 |
| DE | 10139969 | A1 | 2/2003 |
| GB | 1184644 | A | 3/1970 |
| WO | 2005075749 | A1 | 8/2005 |

* cited by examiner

COMPENSATION OF ROTATIONAL SHAFT INCLINATION

CROSS-REFERENCE TO RELATED APPLICATIONS

This application is a U.S. national stage filing of International Patent Application No. PCT/EP2008/003036 filed on Apr. 16, 2008, which claims priority under the Paris Convention to German Patent Application No. 10 2007 018 796.5, filed on Apr. 20, 2007.

FIELD OF THE DISCLOSURE

The present disclosure relates, in general, to means for mounting rotatable shafts and, in particular, to bearing arrangements for compensating rotational shaft deformation or shaft deflection occurring in rotating shafts.

BACKGROUND OF THE DISCLOSURE

In rotatable and, in particular, rotary driven shafts, deformations and, in particular, shaft deflections may occur during operation (i.e. when rotating the shaft), if there are forces not acting in parallel with (e.g. perpendicular to or at an angle to) the longitudinal axis of the shaft.

The following cases may be distinguished, namely cases in which the direction of forces not acting in parallel with the longitudinal axis of the shaft remains substantially the same, and cases in which the direction of forces not acting in parallel with the longitudinal axis of the shaft changes and, in particular, rotational radial forces occur.

In the first case, a substantially stationary shaft deformation or shaft deflection occurs. This may be referred to as rotational deformation or rotational deflection (or bending).

In the second case, a shaft deformation or shaft deflection occurs, the characteristic or direction of which changes as a function of the change in direction of the underlying forces. This is the case, in particular, with rotational radial forces. This may then be referred to—following the term "rotational radial forces" —as rotational shaft deformation or shaft deflection.

Examples of the first case include paper machines and rope winches, wherein the direction of forces not acting in parallel with the longitudinal axis of the shaft does not change (e.g. forces due to cooperating paper rollers arranged on shafts; forces acting on a rope arranged on a rope winch).

Examples of the second case include oscillators and vibrators, wherein unbalanced masses are provided on shafts which are rotated together with the shaft thereby generating rotational radially acting forces with respect to the longitudinal axis of the shaft or axis of rotation.

For compensation of rotational deformation or rotational deflection (or bending) in the first case, it is known, for example, to provide the radially outward part of a shaft bearing (e.g. outer roller bearing ring) with a hinge bearing providing a hinged connection, for example, to a housing. However, such approaches are not suitable or only suitable to a limited degree for providing for compensation in the second case (rotational shaft deformation or shaft deflection).

BRIEF DESCRIPTION OF THE DISCLOSURE

The present disclosure provides a bearing arrangement, an arrangement comprising the bearing arrangement and a shaft, as well as an oscillator according to the independent claims.

The bearing arrangement according to the disclosure is intended for mounting a shaft rotatable around an axis of rotation and comprises a bearing, which includes an inner bearing part for coupling to an end of the shaft and an outer bearing part for coupling to a mounting structure, and a retaining and pivoting element, which is connectable to the inner bearing part or the outer bearing part. The retaining and pivoting element is designed for securing the end of the shaft against movement in a direction in parallel with the axis of rotation in relation to the bearing and for permitting the end of the shaft to be pivoted with respect to the axis of rotation.

The term "coupling" and wordings comparable thereto, such as "coupled", encompass that two components are immediately and directly connected to each other, for example, by means of one or a plurality of screw, clamp, adhesive, welded connections and/or positive and/or non-positive connections. However, the term "coupling" and wordings comparable thereto, such as "coupled", also encompass that two components are indirectly connected to each other, for example, by means of an intermediate connecting element and/or structure.

In comparison thereto, the term "connection" and wordings comparable thereto, such as "connected", are supposed to indicate that two components are immediately and directly connected to each other, e.g. as explained above by way of example.

The terms "inner" and "outer" used for the bearing parts have been chosen for indicating that an inner bearing part is arranged at a lesser distance from the axis of rotation in the radial direction with respect to the axis of rotation than the corresponding outer bearing part.

In preferred embodiments, the inner bearing part may comprise a receiving means for arranging the retaining and pivoting element at least in part therein.

Such a receiving means for arranging the retaining and pivoting element may comprise a recess in a region of the inner bearing part located radially inwards with respect to the axis of rotation.

The recess is preferably formed in a region of the inner bearing part, which is thicker, as compared to other regions of the inner bearing part, in the radial direction with respect to the axis of rotation, i.e. has a greater extension in the radial direction with respect to the axis of rotation.

In further preferred embodiments, the outer bearing part may comprise a receiving means for arranging the retaining and pivoting element at least in part therein.

Such a receiving means for arranging the retaining and pivoting element may comprise a recess in a region of the outer bearing part located radially inwards with respect to the axis of rotation.

The recess is preferably formed in a region of the outer bearing part, which is thicker, as compared to other regions of the outer bearing part, in the radial direction with respect to the axis of rotation, i.e. has a greater extension in the radial direction with respect to the axis of rotation.

The receiving means for arranging the retaining and pivoting element of the inner bearing part and/or the outer bearing part may comprise a recess.

The receiving means for arranging the retaining and pivoting element of the inner bearing part and/or the outer bearing part may comprise a recess having the form of a groove with a substantially semicircular or circular-segment shaped cross-section.

In further preferred embodiments, the recess may be trough or cup-shaped or trough or cup-like.

Moreover, recesses are provided which are defined by areas describing the surface of a hemisphere, a spherical segment, a cone, a frustum or a cuboid.

In further preferred embodiments, the inner bearing part may comprise an annular or hollow-cylindrical region having an inner diameter which is provided for receiving, at least in part, an end region of the shaft having an outer diameter. The inner diameter may be greater than the outer diameter of the shaft end region by a predetermined amount, wherein the predetermined amount then defines the degree by which the shaft may be pivoted with respect to the axis of rotation.

The retaining and pivoting element preferably comprises a bolt or pin.

In further preferred embodiments, the retaining and pivoting element comprises a sphere, a hemisphere, a cone, a frustum or a body comprising a cuboidal portion and a hemispherical, spherical-segment shaped, conical or frustoconical portion.

In further preferred embodiments, the retaining and pivoting element comprises a resilient element or elastically compressible element. In such embodiments, the above-mentioned recess may be dispensed with, if applicable, and the retaining and pivoting element may be attached to the outer circumference of the inner bearing part and/or the outer bearing part. In such embodiments, it is further contemplated that the retaining and pivoting element is pillow-shaped and restricted to a region of the outer circumference of the inner bearing part and/or the outer bearing part or is annular in shape or has the form of a portion of a ring and fully or partially encompasses the outer circumference of the inner bearing part and/or the outer bearing part.

The outer bearing part may comprise a bearing surface extending substantially in parallel with the axis of rotation and/or a bearing surface extending substantially perpendicular to the axis of rotation, which bearing surfaces are each adapted for operative connection with the inner bearing part.

The inner bearing part may (also) comprise a bearing surface extending substantially in parallel with the axis of rotation and/or a bearing surface extending substantially perpendicular to the axis of rotation, which bearing surfaces are each adapted for operative connection with the outer bearing part.

Preferably, at least one bore and/or at least one conduit for supply of lubricant to the at least one bearing surface is formed in the outer bearing part.

Furthermore, the present invention provides an arrangement comprising a shaft having an end and a bearing arrangement according to the invention, wherein the end of the shaft and the inner bearing part or outer bearing part are coupled to each other in a torsion-resistant manner.

The end of the shaft may comprise a receiving means for receiving the retaining and pivoting element at least in part therein.

The receiving means of the shaft for arranging the retaining and pivoting element preferably comprises a recess provided in a region of the end of the shaft located radially inwards with respect to the axis of rotation.

The receiving means of the shaft for arranging the retaining and pivoting element may comprise a recess.

The receiving means of the shaft for arranging the retaining and pivoting element may comprise a recess having the form of a groove with a substantially semicircular or circular-segment shaped cross-section.

In further preferred embodiments, the recess of the shaft may be trough or cup-shaped or trough or cup-like.

Moreover, recesses of the shaft are provided which are defined by areas describing the surface of a hemisphere, a spherical segment, a cone, a frustum or a cuboid.

In embodiments, in which the retaining and pivoting element comprises a resilient element or an elastically compressible element, the recess of the shaft may be dispensed with, if applicable.

In preferred embodiments, the end of the shaft comprises a region having a first diameter and a region having a second diameter being smaller than the first diameter. The region having the second diameter may define a shaft end region which may, at least in part, be received in the bearing.

A transition area between the region having the first diameter and the region having the second diameter may comprise a stop face preventing further pivoting, for example, when the shaft is pivoted with respect to the axis of rotation beyond an admissible and/or desirable degree, for example, by means of contact with a corresponding surface of the inner or outer bearing part.

The transition area between the region having the first diameter and the region having the second diameter may comprise a surface extending substantially perpendicular to the axis of rotation or a shaft region with a continuous change in diameter.

The end of the shaft preferably comprises at least one bore and/or at least one conduit for supply of lubricant, via which a lubricant may be supplied, for example, to the inner bearing part and/or the outer bearing part.

Furthermore, the present disclosure provides an oscillator comprising an arrangement according to the invention (i.e. an arrangement having a shaft and a bearing arrangement according to the invention).

The oscillator may be provided with at least one unbalanced mass which may be rotated by means of the shaft.

BRIEF DESCRIPTION OF THE DRAWINGS

In the following, preferred embodiments of the present invention are described with reference to the attached drawings, in which.

DESCRIPTION OF PREFERRED EMBODIMENTS

Figure 1:
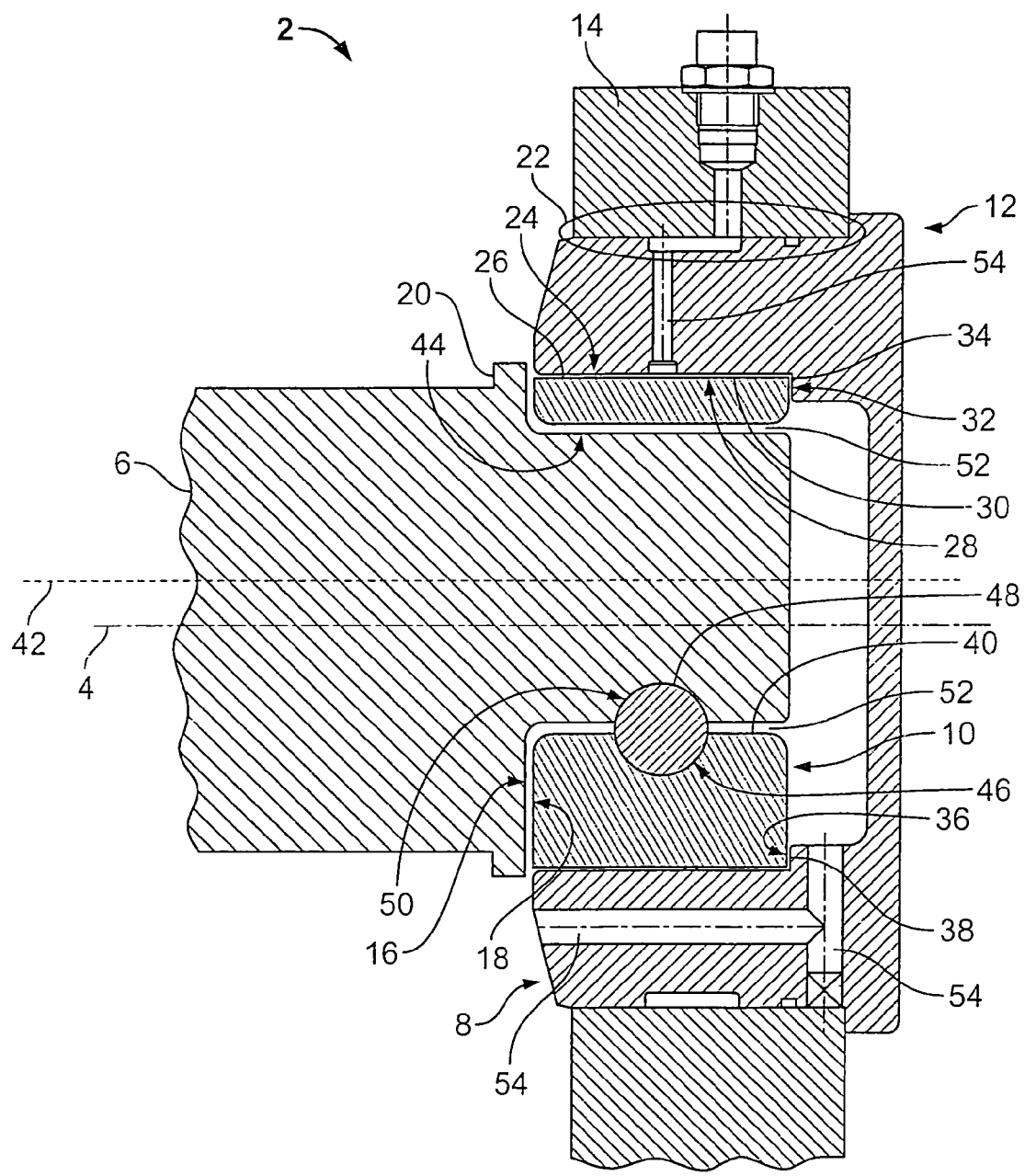
FIG. 1 shows a schematic sectional view of an embodiment of the present invention.
Figure 2:
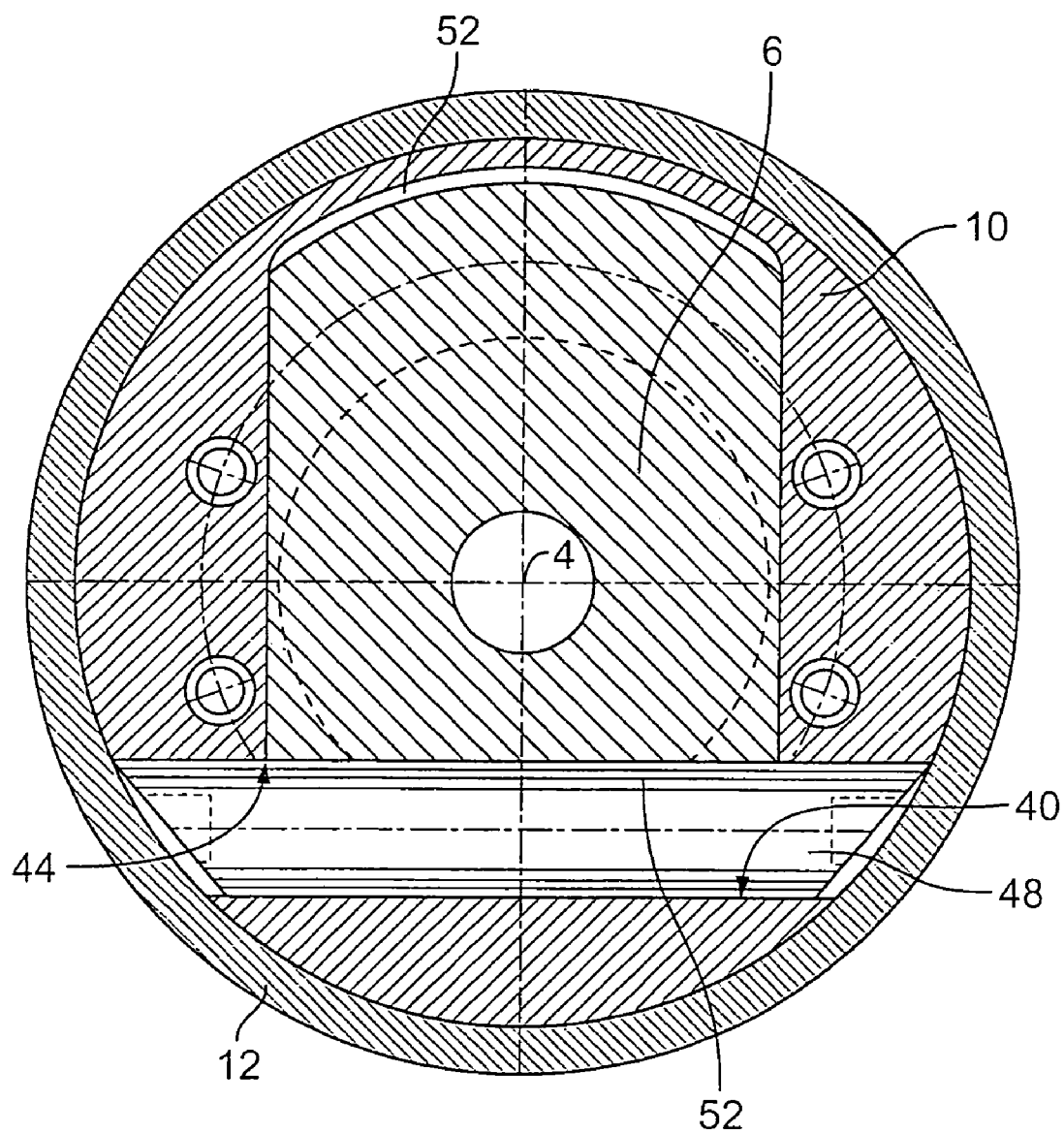
FIG. 2 shows a further schematic sectional view of the embodiment according to FIG. 1.

FIGS. 1 and 2 show preferred embodiments of the present invention which are used, for example, in an oscillator or vibrator or which may be a component thereof. An example of an oscillator or vibrator is described, for example, in WO 2005/075749 A1. In the following, it is referred to an application of the present invention in an oscillator for the sake of illustration; however, as already explained above, application of the present invention is not limited to devices of this kind, rather it is contemplated wherever rotational shaft deformations and/or shaft deflections are to be compensated.

Oscillators and vibrators generate oscillations and/or vibrations by means of one or a plurality of unbalanced masses arranged on one or a plurality of shafts, which oscillations and/or vibrations are transmitted, for example, to piling material (e.g. piles, beams etc.) to be inserted into the soil.

By rotation of the unbalanced mass(es), forces, in particular, centrifugal forces, acting on the bearings of the shaft(s) occur. Moreover, the bearings are subject to high rotational speeds. Since the allowable speed of bearings, in particular, roller bearings, decreases with increasing load rating, the load limits of customary bearings (e.g. roller bearings) are restrictive. The use of plain bearings, as described e.g. in WO 2005/075749 A1, constitutes an improvement over roller bearings.

As explained at the beginning, the shaft of an oscillator is deformed (deflected) during operation due to forces generated by rotation of one or a plurality of unbalanced masses. The deformation/deflection of the shaft may cause the mounted shaft ends to become wedged in their bearings and may cause edge pressure in the bearings (e.g. plain bearings). This may happen, in particular, with increasing rotational speed and/or a greater unbalanced mass, since the deformation or deflection then increases as well. The risk of edge pressure in the bearing increases, if—as is common practice—greater bearing widths are used for avoiding (high) bearing friction.

Wedging of the shaft ends in their bearings could be limited, in theory, by increasing the bearing clearance and/or using smaller bearing widths. However, a greater bearing clearance may entail the occurrence of an increased surface pressure in the bearing and a jamming of the bearing. A narrow bearing must be designed with a greater diameter for not exceeding the maximum allowable surface pressure in the bearing, which may, inter alia, result in a greater bearing clearance having the said disadvantages. Such approaches are thus inadequate.

According to the illustration, the outer bearing part 12 is adapted for connection to a mounting structure 14 and the inner bearing part 10 is adapted for connection to an end of the shaft 6. For example, a housing of the shaft-bearing arrangement or a part thereof may serve as the mounting structure 14.

FIG. 1 shows an embodiment of a bearing arrangement 2 according to the invention provided for mounting a shaft 6 rotatable around an axis of rotation 4.

The bearing arrangement 2 comprises a bearing, which, as a whole, is indicated by 8, including an inner bearing part 10 and an outer bearing part 12.

According to the illustration, the outer bearing part 12 is adapted for connection to a mounting structure 14 and the inner bearing part 10 is adapted for connection to an end 12 of the shaft 6. For example, a housing of the shaft-bearing arrangement or a part thereof may serve as the mounting structure 14.

As illustrated in FIG. 1, the end of the shaft 6 may have a reduced diameter in the region of the inner bearing part 10 as compared to the shaft region located farther to the left in FIG. 1. This change in cross-section may be achieved, as shown in FIG. 1, by means of a surface 16 extending perpendicular to the axis of rotation 4 or by means of a linear or curved transition area (not shown here). The surface 16 or a differently shaped transition area may provide a stop for the inner bearing part 10, in particular, a front face 18 thereof, facing the shaft 6, for example, in case the shaft 6 is pivoted beyond an admissible and/or desirable degree with respect to the axis of rotation 4. The configuration with a reduced diameter at least in the region of the inner bearing part 10 further enables a design reduced in size at least as compared to embodiments without a change in shaft diameter. Embodiments of possible configurations of the end of the shaft may be found below in connection with contemplated embodiments of the inner bearing part 10.

An annular shoulder 20 extending radially outwards may be formed on the outer circumference of the shaft 6. The side of the shoulder 20 facing the bearing 8 may be coplanar with the front face 18 and may provide a coherent stop face with said front face. The stop face being extended in the radial outward direction due to the shoulder 20—in contrast to a stop face defined "only" by the front face 18—may provide for a greater restriction of the region in which the shaft 6 is admissibly and/or desirably pivotable with respect to the axis of rotation 4.

According to the illustration, the outer bearing part 12 has the form of a flange and comprises a mounting region 22, by means of which the outer bearing part 12 may be secured to the mounting structure 14. The mounting region 22 is preferably stepped in order to provide for an improved locking to the mounting structure 14.

The inner bearing part 10 further comprises a bearing surface 24 extending substantially in parallel with the axis of rotation 4, which bearing surface is coated, at least in part, with a friction-reducing material or plain bearing material 26 and/or is composed, at least in part, of such a material.

The bearing surface 24 is provided for operative connection with the inner bearing part 10, in particular, to a bearing surface 28 thereof. The bearing surface 28 may also be coated, at least in part, with a friction-reducing material or plain bearing material 30 and/or may be composed, at least in part, of such a material.

Moreover, the outer bearing part 12 may comprise an annular bearing surface 32 extending radially inwards which is also adapted for operative connection with the inner bearing part 18. Furthermore, the bearing surface 32 is capable of avoiding displacement of the inner bearing part 10 in the direction in parallel with the axis of rotation 4. The bearing surface 32 may (also) comprise, at least in part, a friction-reducing material or plain bearing material 34 and/or may be composed, at least in part, of such a material.

The outer circumferential surface of the inner bearing part 10 provides, at least in part, the bearing surface 28 for operative connection with the bearing surface 24 of the outer bearing part 12. The bearing surface 28 may be coated, at least in part, with a friction-reducing material or plain bearing material 30 and/or may be composed, at least in part, of such a material. In regions located opposite the bearing surface 32 of the outer bearing part 12 and/or which may contact said bearing surface in use, the inner bearing part 10 preferably also comprises a bearing surface 36 which is provided, at least in part, with a friction-reducing material or plain bearing material 38 and/or may be composed, at least in part, of such a material.

The inner circumferential surface 40 of the inner bearing part 10 may also be provided, at least in part, with a friction-reducing material or plain bearing material and/or may be composed, at least in part, of such a material for reducing friction when in contact with the shaft 6 and/or may be provided with a material and/or have a surface finish protecting the inner bearing part 10 from damage when in contact with the shaft 6. In regions, which may contact the inner circumferential surface 40, the shaft 6 may be provided, at least in part, with a friction-reducing material or plain bearing material and/or may be composed, at least in part, of such a material and/or may be provided with a material and/or have a surface finish for protecting it from damage.

The inner bearing part 10 is annular in shape, wherein the outer circumferential surface 24 of the inner bearing part 10 is substantially concentric with the axis of rotation 4. In the shown embodiment, the inner circumferential surface 40 is not concentric with the axis of rotation 4, but concentric with an axis 42 being (slightly) offset in parallel with the axis of rotation 4.

In such embodiments, the outer circumferential surface 44 of the end 12 of the shaft 6 may be, as illustrated in FIG. 1, concentric with the axis 42. This ensures that the shaft 6 rotates around the axis of rotation 4 and not around another axis. In embodiments, in which the outer circumferential surface 44 of the end 12 of the shaft 6 is concentric with the axis of rotation 4, the shaft 6 would not rotate around the axis of rotation 4, but around another axis (e.g. axis 42). In such case, the axis of rotation 4 may be considered as a geometrical (imaginary . . . ) axis of rotation of the shaft and the axis of rotation emerging in use as the actual axis of rotation. Forces (in particular centrifugal forces) occurring in the process due to the unbalanced mass distribution of the shaft 6 with respect to the actual axis of rotation may be used, in particular, in applications in which one or a plurality of unbalanced masses are attached to the shaft 6 (e.g. oscillators, vibrators).

In not shown embodiments, the inner circumferential surface 40 of the inner bearing part 10 is substantially concentric with the axis of rotation 4, whereas the outer circumferential surface 24 is not concentric with the axis of rotation, but concentric with an axis being (slightly) offset in parallel with the axis of rotation. In such cases, rotation of the shaft 6 around the axis of rotation 4 may be achieved by a corresponding configuration and/or positioning of the outer bearing part 12. Alternatively, embodiments may be realized in which the shaft 6 rotates around an axis not coinciding with the axis of rotation 4 in use.

In embodiments having an inner or outer circumferential surface of the inner bearing part 10 not being concentric with the axis of rotation 4, the inner bearing part 10 has various wall thicknesses. In a region having the greatest wall thickness(es), preferably a receiving means 46 is formed. In embodiments having an inner bearing part being, as a whole, concentric with the axis of rotation 4 and having a substantially constant wall thickness, the receiving means 46 may be provided in an arbitrary position; in such cases, the wall thickness of the inner bearing part 10 is preferably dimensioned such that forces introduced in the region of the receiving means 46 will not cause damage.

According to the illustration, the receiving means 46 has the form of a recess in the inner bearing part 10, which recess extends in a straight line in a direction substantially orthogonal to the axis of rotation 4. In particular, the recess 46 is a groove with a substantially circular-segment shaped cross-section (according to FIG. 1, a semicircular cross-section).

The receiving means 46 is provided for partial arrangement of a retaining and pivoting element 48. The retaining and pivoting element 48 may be a bolt or pin, which may be fitted into the recess 46 (e.g. by pressing, . . . ) such that a part of the retaining and pivoting element 48 extends beyond the inner circumferential surface 40 of the inner bearing part 10.

The part of the retaining and pivoting element 48 extending beyond the inner circumferential surface 40 of the inner bearing part 10 is, in the assembled state, received (at least in part) in a receiving means 50 of the shaft 6.

In further embodiments, the retaining and pivoting element 48 may comprise a sphere, a hemisphere, a cone, a frustum or a body comprising a cuboidal portion and a hemispherical, spherical-segment shaped, conical or frustoconical portion. In such cases, the receiving means 46 of the inner bearing part 10 is to be formed analogously and in such a way that the retaining and pivoting element 48 may be received in part therein and extends beyond the receiving means 36 to such an extent that the protruding part may cooperate with the shaft 6 and may, in particular, be engaged in the receiving means 50 thereof.

In the above-mentioned embodiments, the retaining and pivoting element 48 and the receiving means 46 and 50 are preferably designed in such a way that the retaining and pivoting element 48 is movable in at least one of the receiving means 46 and 50 so that the shaft 6 is pivotable with respect to the axis of rotation 4. The retaining and pivoting element 48 may be fixed in one of the receiving means 46 and 50 and may be movably (e.g. rotatably, displaceably, etc.) received in the other receiving means 46 and 50, respectively.

In further preferred embodiments, the retaining and pivoting element 48 comprises a resilient element or an elastically compressible element. In such embodiments, the above-mentioned recess may be dispensed with, if applicable, and the retaining and pivoting element 48 may be attached to the outer circumference of the inner bearing part and/or the outer bearing part. In such embodiments, it is further contemplated that the retaining and pivoting element 48 may be pillow-shaped and restricted to a region of the outer circumference of the inner bearing part and/or the outer bearing part or is annular in shape or has the form of a portion of a ring and fully or partially encompasses the outer circumference of the inner bearing part and/or the outer bearing part.

In such embodiments, pivotability of the shaft 6 with respect to the axis of rotation 4 is achieved by the fact that the retaining and pivoting element 48 is deformed by forces causing the shaft 6 to be pivoted and allows for pivoting of the shaft 6.

The above explanations made with respect to the receiving means 46 of the inner bearing part apply accordingly to the receiving means 50.

The coupling of shaft 6 and inner bearing part 10 by means of the retaining and pivoting element 48, on the one hand, prevents that the shaft 6 and the inner bearing part 10 (and thus the bearing 8) may be displaced in relation to each other in the direction in parallel with the axis of rotation 4. On the other hand, it is achieved by the retaining and pivoting element 48 that the shaft 6, in particular, the end 12 of the shaft 6, is pivotable with respect to the axis of rotation 4.

The diameter of the inner circumferential surface 40 of the inner bearing part 10 and/or the diameter of the outer circumferential surface 44 of the shaft end 12 are dimensioned such that a space or gap 52 is created between the inner circumferential surface 40 and the outer circumferential surface 44 in the non-pivoted state of the shaft 6. The size of this space or gap 52, for example, in combination with the shape and/or position of the receiving means 46 and/or 50 and/or the form of the retaining and pivoting element 48 determines an amount by which the shaft 6 is pivotable with respect to the axis of rotation 4. If the shaft is pivoted to a greater extent, the inner circumferential surface 40 and the outer circumferential surface 44 contact each other; the shaft 6 cannot be pivoted any further. Supplementary or alternatively, pivotability may be limited by means of the stop face on the shaft 6 (see above reference numerals 18 and 20).

Bores and/or conduits 54 are formed in the outer bearing part 12, via which lubricant is supplied to the above-mentioned bearing surfaces 24, 28, 32, 36 and 40. The bores and/or conduits 54 may be supplied with a lubricant via one or a plurality of feed lines formed in the mounting structure 14 or a rotary feedthrough in the shaft 6.

The pressure prevailing during operation caused by a lubricant in the bearing 8 (e.g. hydrodynamic oil pressure) may provide for an (e.g. parallel) orientation of the inner bearing part 10 and the outer bearing part 12 in relation to each other. In particular, it is contemplated to calculate forces generated in the bearing by a lubricant and/or the supply thereof such that, even if the shaft 6 is pivoted with respect to the axis of rotation 4, the inner bearing part 10 and the outer bearing part 12 are aligned with respect to each other such that they work properly and are not excessively strained.

In further embodiments not shown here, it is contemplated that the inner bearing part 10 is coupled to the end 12 of the shaft 6 in a conventional manner, for example, by means of a clamp, adhesive or welded connection and/or a positive and/or non-positive connection or by a connecting structure arranged between the shaft 6 and the inner bearing part 10 (e.g. a bearing receiving means for the inner bearing part 10 attached to the shaft 6). In such embodiments, pivotability of the shaft 6 with respect to the axis of rotation 4 is achieved by arranging a retaining and pivoting element between the outer bearing part 12 and the mounting structure 14.

The mode of operation of the embodiments described with reference to FIG. 1 is as follows:

Rotational movements of the shaft 6 are accommodated and supported by the bearing 8. If rotational shaft deformations and/or shaft deflections occur upon rotation of the shaft 6 and rotational inclinations of the shaft end 12 arise as a result thereof, one or a plurality of pivoting movements or pivoted positions resulting therefrom are accommodated and compensated rotationally, i.e. rotating at shaft speed, by means of "pivot mounting" provided by the retaining and pivoting means 48, since a pivot mounting is provided by the retaining and pivoting element 48 which is present in a region rotating at shaft speed.

The invention claimed is:

1. A bearing arrangement for a shaft rotatable around an axis of rotation comprising:
   a bearing including an inner bearing part for coupling to an end of the shaft and an outer bearing part for coupling to a mounting structure; and
   a retaining and pivoting element;
   wherein the retaining and pivoting element is connectable to the inner bearing part in such a way that the retaining and pivoting element rotates with the shaft;
   wherein the retaining and pivoting element is designed for securing the end of the shaft against movement in a direction in parallel with the axis of rotation in relation to the bearing;
   wherein the inner bearing part comprises a receiving means for partial arrangement of the retaining and pivoting element therein;
   wherein the receiving means for arranging the retaining and pivoting element comprises a recess in a region of the inner bearing part located radially inwards with respect to the axis of rotation; and
   wherein the recess is formed in a region of the inner bearing part, which is thicker, as compared to other regions of the inner bearing part, in the radial direction with respect to the axis of rotation.

2. The bearing arrangement according to claim 1, wherein the receiving means for arranging the retaining and pivoting means comprises a recess.

3. The bearing arrangement according to claim 2, wherein the recess has the form of a groove with a substantially semicircular or circular-segment shaped cross-section.

4. The bearing arrangement according to claim 2, wherein the recess is trough or cup-shaped or trough or cup-like.

5. The bearing arrangement according to claim 1, wherein the outer bearing part comprises a bearing surface extending substantially in parallel with the axis of rotation for operative connection with the inner bearing part.

6. The bearing arrangement according to claim 5, wherein the outer bearing part comprises at least one bore and/or at least one conduit for supply of lubricant to the bearing surface.

7. The bearing arrangement according to claim 1, wherein the outer bearing part comprises a bearing surface extending substantially perpendicular to the axis of rotation for operative connection with the inner bearing part.

8. The bearing arrangement according to claim 1, wherein the inner bearing part comprises a bearing surface extending substantially in parallel with the axis of rotation for operative connection with the outer bearing part.

9. The bearing arrangement according to claim 1, wherein the inner bearing part comprises a bearing surface extending substantially perpendicular to the axis of rotation for operative connection with the outer bearing part.

10. A bearing arrangement for a shaft rotatable around an axis of rotation comprising:
    a bearing including an inner bearing part for coupling to an end of the shaft and an outer bearing part for coupling to a mounting structure; and
    a retaining and pivoting element;
    wherein the retaining and pivoting element is connectable to the inner bearing part in such a way that the retaining and pivoting element rotates with the shaft; and
    wherein the inner bearing part comprises an annular or hollow-cylindrical region having an inner diameter for receiving an end region of the shaft having an outer diameter, wherein inner diameter is greater than the outer diameter of the shaft end region by a predetermined amount and wherein the predetermined amount defines the degree by which the shaft may be pivoted with respect to the axis of rotation.

11. The bearing arrangement according to claim 10, wherein the retaining and pivoting element comprises a bolt or pin.

12. An arrangement comprising:
    a shaft having an end, and
    a bearing arrangement for a shaft rotatable around an axis of rotation comprising:
    a bearing including an inner bearing part for coupling to an end of the shaft and an outer bearing part for coupling to a mounting structure; and
    a retaining and pivoting element,
    wherein the retaining and pivoting element is connectable to the inner bearing part in such a way that the retaining and pivoting element rotates with the shaft;
    wherein the end of the shaft and the inner bearing part are coupled to each other by means of the retaining and pivoting element in a torsion-resistant manner;
    wherein the end of the shaft comprises a receiving means for partial arrangement of the retaining and pivoting element therein;
    wherein the receiving means of the shaft for arranging the retaining and pivoting means comprises a recess; and
    wherein the recess is trough or cup-shaped or trough or cup-like.

13. The arrangement according to claim 12, wherein the recess has the form of a groove with a substantially semicircular or circular-segment shaped cross-section.

14. The arrangement according to claim 12, wherein the receiving means of the shaft for arranging the retaining and pivoting element comprises a recess in a region of the end of the shaft located radially outwards with respect to the axis of rotation.

15. A arrangement comprising:
    a shaft having and end, and
    a bearing arrangement for a shaft rotatable around an axis of rotation comprising:
    a bearing including an inner bearing part for coupling to an end of the shaft and an outer bearing part for coupling to a mounting structure; and
    a retaining and pivoting element, wherein the retaining and pivoting element is connectable to the inner bearing part in such a way that the retaining and pivoting element rotates with the shaft;

wherein the end of the shaft and the inner bearing part are coupled to each other by means of the retaining and pivoting element in a torsion-resistant manner; and wherein the end of the shaft comprises a region having a first diameter and a region having a second diameter being smaller than the first diameter, wherein the region having the second diameter defines a shaft end region to be received, at least in part, in the bearing.

16. The arrangement according to claim 15, wherein a transition area between the region having the first diameter and the region having the second diameter, comprises a stop face.

17. The arrangement according to claim 16, wherein the transition area between the region having the first diameter and the region having the second diameter comprises a surface extending substantially perpendicular to the axis of rotation.

18. An arrangement comprising:

a shaft having an end, and a bearing arrangement for a shaft rotatable around an axis of rotation comprising:

a bearing including an inner bearing part for coupling to an end of the shaft and an outer bearing part for coupling to a mounting structure; and a retaining and pivoting element, wherein the retaining and pivoting element is connectable to the inner bearing part in such a way that the retaining and pivoting element rotates with the shaft; and wherein the end of the shaft and the inner bearing part are coupled to each other by means of the retaining and pivoting element in a torsion-resistant manner; and wherein the outer bearing part comprises at least one bore and/or at least one conduit for supply of lubricant.

* * * * *